United States Patent [19]
Take et al.

[11] Patent Number: 4,645,548
[45] Date of Patent: Feb. 24, 1987

[54] PROCESS FOR PRODUCING NON-COMBUSTIBLE GYPSUM BOARD AND NON-COMBUSTIBLE LAMINATED GYPSUM BOARD

[75] Inventors: Takao Take, Chibashi; Katsuaki Kaneko, Ohmorinishi; Kokyo Kusunoki, Ushikumachi; Toshinobu Ichiba, Ishiokashi, all of Japan

[73] Assignees: Onoda Cement Co Ltd, Yamaguchiken; Asahi Asbestos Co Ltd, Tokyoto, both of Japan

[21] Appl. No.: 698,674

[22] Filed: Feb. 5, 1985

[30] Foreign Application Priority Data

Feb. 14, 1984 [JP] Japan ................................. 59-25587
Mar. 13, 1984 [JP] Japan ................................. 59-47693

[51] Int. Cl.$^4$ .............................................. B32B 31/06
[52] U.S. Cl. ........................................ 156/39; 106/109; 428/703
[58] Field of Search ..................... 106/109; 156/39; 428/703

[56] References Cited

U.S. PATENT DOCUMENTS 3,616,173 10/1971 Green et al. ................. 106/109 X
4,190,455 2/1980 Bijen et al. ................... 106/109 X
4,286,994 9/1981 Müller et al. ..................... 106/109

FOREIGN PATENT DOCUMENTS

51-19449 6/1976 Japan .
53-25339 7/1978 Japan .
55-36628 9/1980 Japan .

Primary Examiner—Robert A. Dawson
Attorney, Agent, or Firm—Fred Philpitt

[57] ABSTRACT

A novel process for producing a non-combustible gypsum board and a non-combustible laminated gypsum board having superior practical physical properties, smoothly and efficiently is provided, which process is characterized by preparing a mixture consisting of a powdery gypsum consisting of 50 to 95 parts by weight of a hydrating gypsum and 5 to 50 parts by weight of gypsum dihydrate, a definite amount of fibers and a definite amount of a caking retarder and a necessary amount of water; molding the mixture before the hydrating gypsum is hydrated; and setting and drying the resulting molded material.

20 Claims, 5 Drawing Figures

PROCESS FOR PRODUCING NON-COMBUSTIBLE GYPSUM BOARD AND NON-COMBUSTIBLE LAMINATED GYPSUM BOARD

BACKGROUND OF THE INVENTION

1. Field of the Invention

This invention relates to a process for producing a non-combustible gypsum board and a non-combustible laminated gypsum board.

More particularly, it relates to a process for producing a high quality, non-combustible gypsum board and non-combustible laminated gypsum board, by molding, setting and drying a mixture of a powdery gypsum consisting of 50 to 95 parts by weight of a hydraulic gypsum and 5 to 50 parts by weight of gypsum dihydrate (100 parts by weight in total), with definite amounts of fibers and a setting retarder and a necessary amount of water.

Further, this invention relates to a non-combustible laminated gypsum board and a process for producing the same. More particularly it relates to the above board obtained by subjecting a mixture of a powdery gypsum, fibrous materials, a gypsum setting retarder and water to sheet-making and subjecting the resulting green sheet to lamination and press molding before a hydrating gypsum in the green sheet is hydrated.

2. Description of the Prior Art

Gypsum boards have been widely used particularly as interior materials since they can be economically utilized and are superior in fire resistance, sound insulating properties, heat insulating properties, dimensional stability and processability among inorganic, noncombustible building materials. The basis of gypsum board production techniques consists in adding water to calcined gypsum obtained by dehydrating gypsum dihydrate on heating, followed by molding and setting the mixture to thereby obtain a sheet-form material of a definite shape. Thus, gypsum dihydrate having no set properties cannot be used as gypsum in principle, and if gypsum dihydrate is present in admixture with calcined gypsum even in a few %, the strength of the resulting molded products is not only notably reduced, but also in the case of paper-covered gypsum boards, adhesion between paper and gypsum core is lost. Besides, since gypsum dihydrate promotes gypsum hydration, the amount of the setting retarder blended is increased for relieving the function; thus such use of calcined gypsum with gypsum dihydrate has been neglected (see Japanese patent publication No. Sho 57-49004/1982). Accordingly, if it is possible to produce an equivalent gypsum board to known ones from a powdery gypsum obtained by replacing a considerably large proportion of calcined gypsum by gypsum dihydrate, it will be possible to save an enormous heat energy required for producing calcined gypsum from gypsum dihydrate.

On the other hand, there have been proposed certain gypsum boards obtained by using no calcined gypsum but using gypsum dihydrate as it is and molding and setting it and processes for producing the same. However, any of these could not have been practically used as building materials, since, for example, 1 the bending strength of gypsum boards obtained are only about $10 \sim 35$ Kg/cm$^2$ in spite of needing applied pressures as extremely high as 300 Kg/cm$^2$ or greater (see Japanese patent publication No. Sho 49-31012/1974) or 2 although press molding is possible under pressures as relatively low as $10 \sim 250$ Kg/cm$^2$, the bending strength of the resulting products are at most as very low as about $5 \sim 30$ Kg (see Japanese patent publication No. Sho 55-349/1980).

In order to overcome these difficulties of well-known gypsum boards, there has been proposed a process for producing fibers-incorporated gypsum boards from a slurry having a calcined gypsum and fibers mixed with and dispersed in water, according to sheet-making process (see Japanese patent publication No. Sho 57-49004/1982).

The present inventors have made extensive research in order to solve the above problems of the prior art, that is, in order to achieve energy-saving in the aspect of raw material by utilizing gypsum dihydrate in the production of gypsum boards, in order to relieve the production conditions of products wherein gypsum dihydrate is used therein and in order to improve the strengths of such products. As a result, we have found that when gypsum dihydrate is used in a proportion of $5 \sim 50$ parts by weight based on a powdery gypsum used in the fibers-incorporated gypsum boards, and hydraulic gypsum is used in a proportion of the remainder, that is, $95 \sim 50$ parts by weight, then surprisingly enough, the resulting gypsum boards are not inferior in the practical strengths to those obtained by using hydraulic gypsum in 100%, and the production process can be carried out smoothly and efficiently; and based on this finding, the present invention has been completed.

Further the present inventors have made extensive research on the technical problem of the above-mentioned fiber gypsum boards. As a result, we have found that when a green sheet of 6 mm thick is prepared employing a conventional sheet-making apparatus, two or more of the green sheet are laminated before the hydraulic gypsum in the green sheet is hydrated, press-molded under a pressure of $30 \sim 500$ Kg/cm$^2$, and set and dried, then the resulting laminate is integrated, the tensile strength between the layers and the laminated gypsum board is not different from that of the unlaminated thin sheet, a thick sheet having a desired thickness can be obtained and also the production can be carried out at a similar sheet-making velocity to that in the case of thin sheet production and alike efficiently; thus the present invention has been completed.

As is apparent from the foregoing, an object of the present invention is to provide a novel process for producing a gypsum board, and more particularly it is to provide a process which can at the same time use hydraulic gypsum and gypsum dihydrate as raw material gypsum powder, can be carried out smoothly and efficiently and can yield a product having practical strengths.

Further, as is apparent from the foregoing, another object of the present invention directed to a fiber gypsum board in another aspect is to provide a thick fiber gypsum board (non-combustible laminated gypsum board) having fire resistance, sound insulating properties, heat insulating properties, high impact properties and other practical physical properties which could not have been obtained with conventional fiber gypsum boards (thin board), and a process for producing the same efficiently. Still another object of the present invention is to extend concrete application fields of fiber gypsum boards.

SUMMARY OF THE INVENTION

The present invention has the following main constitutions:

(1) A process for producing a non-combustible gypsum board which comprises preparing a mixture consisting of a powdery gypsum consisting of 50 to 95 parts by weight of a hydraulic gypsum and 5 to 50 parts by weight of gypsum dihydrate, 0.5 to 30 parts by weight of fibers based on 100 parts by weight of said oowdery gypsum, 0.1 to 2.0 parts by weight of a setting retarder and a necessary amount of water, molding said mixture before said hydraulic gypsum is hydrated, and setting and drying the resulting molded material.

(2) A process for producing a non-combustible laminated gypsum board which comprises preparing a mixture consisting of a powdery gypsum consisting of 50 to 95 parts by weight of a hydraulic gypsum and 5 to 50 parts by weight of gypsum dihydrate, 0.5 to 30 parts by weight of fibers based on 100 parts by weight of said powdery gypsum, 0.1 to 2.0 parts by weight of a setting retarder for the hydraulic gypsum based on 100 parts by weight of said hydraulic gypsum and a necessary amount of water;

making the mixture into a green sheet according to Hatschek process;

laminating two or more of the green sheet before the hydrating gypsum in the green sheet is hydrated;

molding the laminated sheets under a pressure of 30 to 500 Kg/cm² to thereby integrate them; and setting and drying the resulting molded laminate.

DETAILED DESCRIPTION OF THE PREFERRED EMBODIMENTS

The constitution and effectiveness of the present invention will be described below in more detail.

The specific feature of the present invention in the aspect of the raw materials consists in a substantially simultaneous use of a hydraulic gypsum and gypsum dihydrate. The hydraulic gypsum to be used refers to either one of α-type hemihydrate gypsum, β-type hemihydrate gypsum or soluble anhydrite, each obtained by heat-treating gypsum dihydrate according to known method, or a mixture of two kinds or more of these gypsums. The particle size of the hydraulic gypsum used is preferably 5,000 cm²/g or less in terms of a value of specific surface area according to Braine permeability method.

If the hydrating gypsum has a small particle size much exceeding the value, there occurs a tendency that the setting time of the molded product obtained from the above mixture of the present invention is improperly shortened, and if it is intended to overcome such a tendency, the amount of the setting retarder added increases: hence fine particles as above are undesirable.

To the contrary if the particle size is too large, the resulting set body i.e. gypsum board has a reduced strength. Thus, it is preferred that the particle size be 500μ or less in terms of the maximum particle size and the value of specific surface area according to Braine permeability method be 1,000 cm²/g or more. In addition, if a sheet-making process is employed as the molding process in the present invention, the value of specific surface area is preferably 5,000 cm²/g or less, since it is possible to minimize scattering away of the hydraulic gypsum used, into the filtered water.

On the other hand, if the gypsum dihydrate has a particle diameter of 500μ or less, its origin or preparation process raises no problem. As is well known, gypsum dihydrate as industrial raw material includes natural products and besides, a number of byproducts obtained in chemical industries, such as flue desulfurization gypsum, phosphoric acid gypsum, salt manufacture gypsum, titanium gypsum and fluoric acid gypsum. Bulk products such as natural gypsum are required to be milled up to the above particle size. In this respect, other chemical gypsums are more readily utilized. On the other hand, if the gypsum dihydrate has an excessively small particle size, it notably accelerates setting time of hydraulic gypsum (hemihydrate gypsum and/or soluble anhydrous gypsum) coexistent with the gypsum dihydrate; this is accompanied with a drawback that in order to prevent this, it is necessary to increase the amount of the setting retarder to be added to the mixture for producing the gypsum board. Thus, the particle size of the gypsum dihydrate is preferably 5,000 cm²/g or less in terms of the value of specific surface area according to Braine permeability method. When the gypsum dihydrate is used, it is preferably mixed with and dispersed in fibers to be used, at the time of making the fibers discrete.

As for the proportions of the hydraulic gypsum and gypsum dihydrate used, the former is used in 50 to 95 parts by weight and the latter, in 5 to 50 parts by weight, each based on the total amount of the both i.e. 100 parts by weight. If the proportion of the former is less than 50 parts by weight, the strength of the resulting molded product is insufficient, while if it exceeds 95 parts by weight, this is contrary to the object of the present invention of saving the hydraulic gypsum. On the other hand, if the latter is mixed in more than 50 parts by weight, the strength of the resulting molded product is notably reduced and the utility of gypsum board finally obtained is lost. The relation between the mixing proportion of gypsum dihydrate based on total gypsum powder and the strength of gypsum board is illustrated in the following Table.

TABLE

Mixing proportion of gypsum dihydrate and strength of gypsum board (Kg/cm²)

| Pressure applied Kg/cm² | Mixing proportion (% by weight) | | | | |
|---|---|---|---|---|---|
| | 0 | 25 | 45 | 60 | 80 |
| 30 | 137 | 125 | 112 | | |
| 50 | 148 | 138 | 115 | | |
| 100 | 155 | 162 | 144 | 84 | 43 |

Examples of the fibers used in the present invention are inorganic fibers such as asbestos fibers or glass fibers and natural or synthetic organic fibers such as cellulose fibers, Vinylon fibers, polypropylene fibers or polyamide fibers, and these fibers may be used alone or in combination of two kinds or more thereof. Among these fibers, particularly asbestos fibers and cellulose fibers have a strong adhesion to gypsum (set material); hence it is preferred to use either one kind of these fibers in the fibers used or to use these fibers in admixture.

Mixing of the above fibers with the above mixture used for producing the gypsum board of the present invention improves the brittleness of the resulting gypsum set material and at the same time the high impact strength, bending strength and flexibility. The proportion of the fibers in the mixture is preferably 0.5 to 30 parts by weight based on 100 parts by weight of the powdery gypsum. If it is less than 0.5 part by weight, the above various effects are insufficiently exhibited, while even if it exceeds 30 parts by weight, the effects are not more exhibited; hence this is not economical, and there is a fear that a part of the physical properties lowers contrarily.

The amount of water used in the mixture of the present invention has no particular limitation and varies depending on the molding method. However, when water is mixed in 15 to 2,500% by weight based on the amount of the mixture but excluding water, it is possible to obtain an easily moldable mixture. The necessary minimum amount of water is an amount of water necessary for completely hydrating the hydraulic gypsum.

As for the setting retarder for gypsum used in the present invention, any of known substances may be used, such as glycerine, alcohols, phosphates, carboxylic acids, oxycarboxylic acids or salts thereof and amino acid derivatives. However, in the case where an amount of gyspum dihydrate as large as 5 to 50 parts by weight is blended in 100 parts by weight of the powdery gypsum as in the present invention, it is particularly necessary to satisfy such conditions that 1 addition of its small amount brings about a great setting-retarding effect and 2 the strength of the resulting gypsum set body is not reduced. From the above viewpoint, the best retarder found by the present inventors is tartaric acid or its metal salts or preferably a combination of at least one of them with a specified amino acid derivative (a condensate of an acidic amino acid and formaldehyde). The metals for the metal salts are preferably alkali metals.

The amount of the setting retarder used varies depending on the molding method of the gypsum board aimed by the process of the present invention, and normally 0.1 to 2 parts by weight based on 100 parts by weight of the hydraulic gypsum are required. If the amount is less than 0.1 part by weight, the setting-retarding effect cannot be exhibited, while if it exceeds 2 parts by weight, the strength of the resulting gypsum set body is reduced.

In the process of the present invention, the pH of the mixture or slurry obtained by mixing the above various raw materials is adjusted to preferably 7 or higher. The adjustment may be carried out by adding to the mixture, a small amount of a basic substance as an additive such as cement, slaked lime, etc. Such a pH adjustment enhances the effect of the retarder and at the same time not only prevents rust or scale from occurring in the production facilities of the gypsum board in the present invention, but also exhibits a rust prevention effect upon nails driven into the resulting gypsum board product when it is used.

Further we have found that when Portland cement or calcium carbonate powder as the basic substance is added in a larger amount than that necessary for usual pH adjustment, improvement in other physical properties is obtained in addition to the effect of the pH adjustment alone. When Portland cement is added, the water resistance of the resulting product is obtained. As a result, the defect of the gypsum products which have so far been regarded as weak to water is considerably improved; for example, the resulting products can be used at the interior parts such as kitchen, toilet, etc. wetted by water or a part of outer wall; thus it has become possible to further extend the application fields of the products according to the present invention.

On the other hand, when calcium carbonate powder is added, the curved surface-processing properties which are one of the specific features of the products according to present invention are more improved. For example, when calcium carbonate powder is added, such physical properties have been obtained that when water is sprayed on a product of the present invention having a thickness of 6 mm, followed by bending it, the curvature radius of the resulting product is 30 cm or less and no crack occurs on the surface. This is also evidenced by the fact that the deflection of a test piece of the product at the time of water saturation increases. Such improvement in the curved surface-processing makes it easy to mount the product onto the curved surface part which has so far been regarded as difficult; thus it has become possible to further extend the application fields of the products according to the present invention.

The proportions of Portland cement and calcium carbonate powder added are both suitably in the range of 5 to 30% by weight based on the total amount of the material and the powdery gypsum. If the proportions are less than 5% by weight, the above effects are not observed, while if they exceed 30% by weight, negative elements take place. Namely in the case of Portland cement, the percentage of dimensional change increases and also the processability of product is reduced. In the case of calcium carbonate powder, the bending strength lowers. Thus, outside the above range, the specific features of the products of the present invention are damaged.

Further it is preferred to add either one of Portland cement or calcium carbonate powder. However, if these are used at the same time, the respective effects of these are compensated; hence the above improvements in physical properties cannot be observed.

As for the molding process for producing the gypsum board using the mixture in the present invention, any of known molding processes such as casting, dewatering, compression under pressure or sheet-making may be employed. However, even when any one of the molding processes is employed, the hydraulic gypsum in the mixture should be molded before it is hydrated. If the hydraulic gypsum in the mixture is hydrated and thereafter molding is carried out, the strength of the resulting gypsum core is notably reduced to make it impossible to obtain a gypsum board having practical strengths. For the same reason, if the step of compression under pressure is included as a part of the molding steps, the step should be completed before the hydraulic gypsum in the raw material mixture is hydrated. The pressure applied is required to be 10 to 500 $Kg/cm^2$. In particular, as to the gypsum board obtained by subjecting the mixture in the process of the present invention to compression molding under a pressure of 50 $Kg/cm^2$ or higher, it is possible to obtain those which are almost not inferior in strength to those using hydraulic gypsum alone as the powdery gypsum, in spite of gypsum dihydrate being mixed.

Further we have found that when two or more of the green sheet obtained by the sheet-making are laminated before the hydraulic gypsum in the green sheet is hydrated, followed by press molding under a pressure of 30~500 Kg/cm$^2$ and then setting and drying, then the laminated gypsum hoard is integrated, the tensile strength between the layers of the laminated sheets is not different from that of unlaminated thin sheet to make it possible to obtain a thick board having a desired thickness and the production of the board can be carried out efficiently at a similar sheet-making velocity to that in the case of production of thin sheet.

The process of the present invention will be described below in more detail.

First, 100 parts by weight of a gypsum powder consisting of 50~95 parts by weight of a hydraulic gypsum and 50~5 parts by weight of gypsum dihydrate, 0.5~30 parts by weight of a fibrous material based on the gypsum powder and 0.1~2.0% by weight of a setting retarder based on the hydraulic gypsum are mixed, followed by adding water to prepare a slurry. This slurry is taken up on a sheet-making roll 7 (a rotating drum) in FIG. 1 in the same manner as in conventional sheet-making process, up to a necessary thickness. In the step of taking up on the sheet-making roll, it is possible to have a fibrous material or the like contained in the slurry by spraying or another means. The thickness of the sheet taken up is made 10 mm or less, preferably 6 mm or less. The green sheet thus taken up is cut by a cutter 8 to obtain a green sheet 9 having a desired size, which is laminated and press-molded at the next step.

Figure 1:
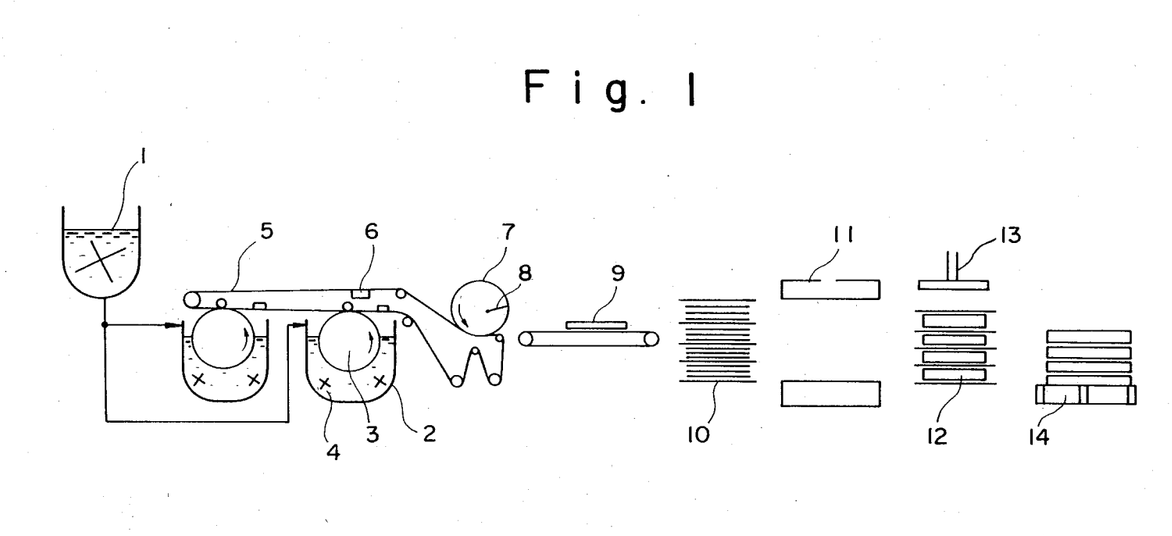
FIG. 1 shows a flow sheet illustrating production of a Hatschek process flow diagram and production of a sheet laminate therefrom.
Figure 2:
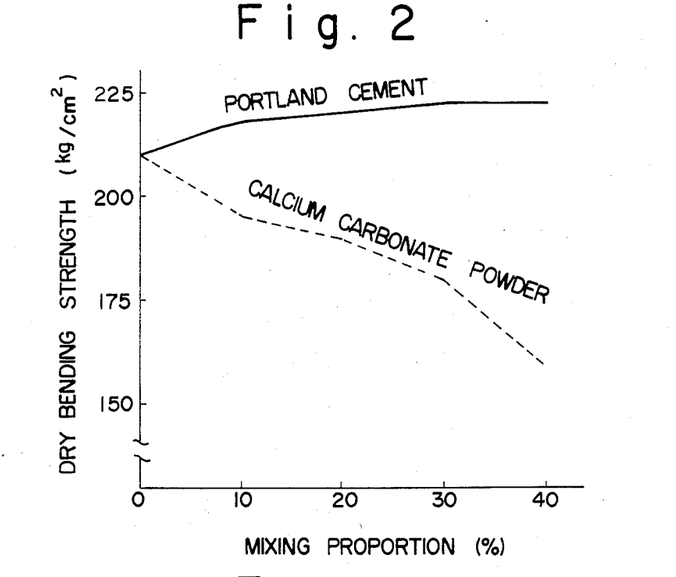
FIGS. 2, 3, 4 and 5 show respectively charts obtained by plotting the correlations of the proportions of basic substances blended, to bending strength, deflection at the time of water saturation, percentage of dimensional change and water resistance, in Examples 23~30 and Comparative examples 14~16.
Figure 3:
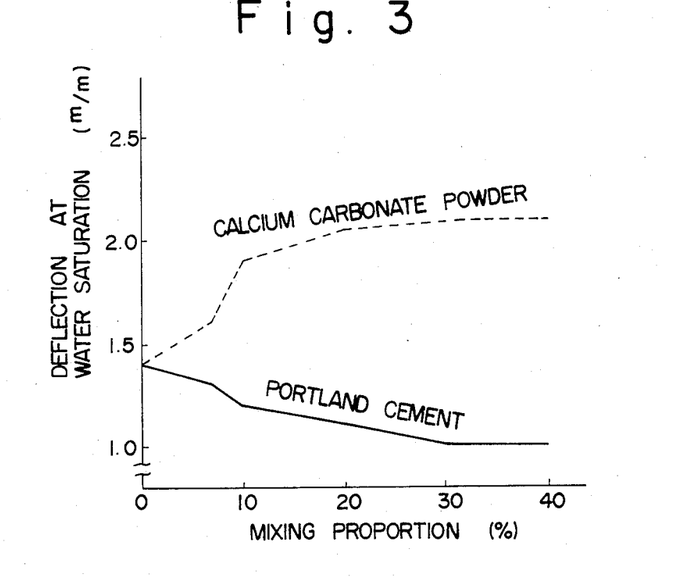
Figure 4:
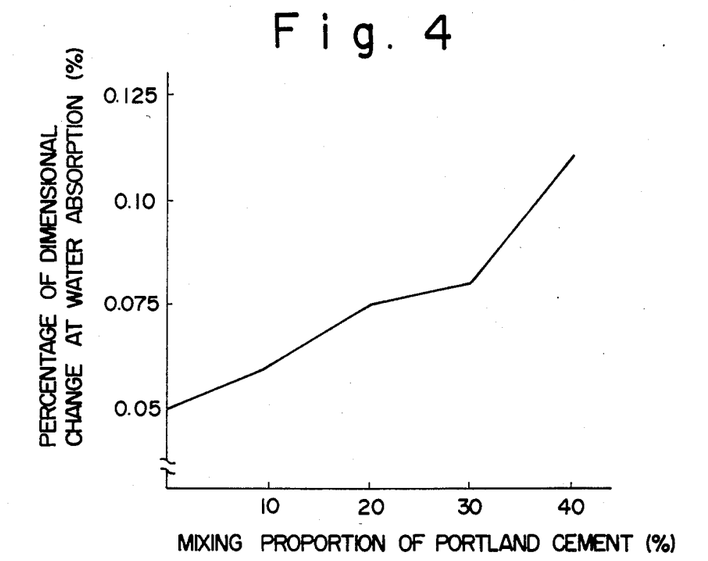
Figure 5:
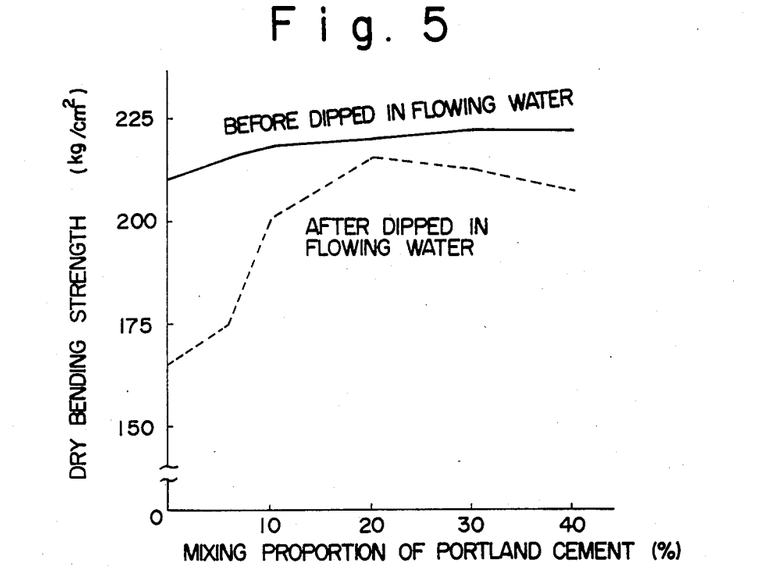

A plurality of the green sheets 9 obtained above are stacked on a stainless sheet 10 so as to give a desired thickness. Although the number of the sheets to be stacked has no particular limitation, it may be about 2 to 30.

Further, between these green sheets may be placed a reinforcing material which does not hinder adhesion of the sheets onto one another, such as glass fibers or other reticular materials.

The combination of the laminated green sheets with the stainless sheet thus obtained is stacked in a plurality of stages, followed by setting the resulting material onto a press molding machine 11 and subjecting it to press molding. During the process, it is necessary to adjust the amount of the setting retarder blended, the preparation time of the green sheet and the time during which the sheets are stacked, lest the hydraulic gypsum in the green sheet formed on the sheet-making roll should be hydrated in advance of its press molding. The time during which the sheet is led from the sheet-making roll to the press-molding machine is usually 10 minutes to 3 hours, preferably shorter than one hour. If hydration of the hydraulic gypsum in the green sheet is started in advance of the press molding, the adhesion of the green sheets onto one another and the strength of the resulting laminated gypsum board are notably reduced to make it impossible to obtain a product having the objective quality. The press molding is carried out under a pressure of 30 to 500 Kg/cm$^2$, for a pressure-retaining time of 1 to 30 minutes and at room temperature. As for the press molding time, there is an adequate time depending on the stacked state of the green sheets, and it is necessary to carry out dewatering at an adequate speed. If dewatering is rapidly carried out at a speed exceeding the adequate one, cracks occur in the laminated sheets. Further, if the applied pressure is inadequate and dehydration is insufficient, the exudated water returns to the laminated sheets when the pressure is reduced so that the green sheets are set in a state of insufficient adhesion. As a result, laminated board having a good quality cannot be obtained.

The press-molded green sheets 12 prepared as above are immediately separated from the stainless sheet by means of a vacuum carrier 13, stacked on a pallet 14 and hydrated for a necessary period of time. The molded gypsum board is dried after completion of hydration. Drying may be carried out under adequate conditions in a known manner.

The gypsum board of the present invention is obtained as above, and the flown-away mixture which occurs during the production steps may be, as it is, circulated and used.

Further, a substandard product in terms of shape in the process of the present invention or a recovered material at the cut end part of the board at the time of shape-adjustment may be again milled and reused as a part of gypsum dihydrate and fibers as raw materials. The reason that these materials can be used through such recycle or recovery is that even when the hydraulic gypsum in the reused raw materials is converted into gypsum dihydrate through hydration, these are dealt with as raw material gypsum dihydrate so that the mixing proportions of raw materials can be adjusted thereby; hence this can be said to be an effect which cannot be anticipated from the prior art using the hydraulic gypsum alone. However, in the case of the above case, too the proportion of gypsum dihydrate in all the raw materials should not, of course, exceed 50% by weight of the powdery gypsum.

In the process of the present invention, in order to improve the physical properties of the objective gypsum board, it is possible to use various known additive materials. Examples thereof are wollastonite, mica, vermiculite, diatomaceous earth, perlite, etc., although the materials are not limited thereto. The amount of these mineral substances added is preferably determined within the range of the amount of the fibrous materials used in the raw material mixture of the present invention. Namely, when the total amount of the fibrous materials and the mineral substances used is in the range of 0.5 to 30 parts by weight based on 100 parts by weight of the powdery gypsum, good results are obtained.

The process of the present invention is economical since it is unnecessary to use an expensive hydraulic gypsum, alone, as the powdery gypsum, and it is possible to use the gypsum together with cheap gypsum dihydrate up to its half amount. Further, the process of the present invention can be advantageously carried out particularly when it is applied to sheet-making process, for the following reasons:

1 Since the properties to be filtered, of the slurry is improved, its sheet-making properties are improved; hence it is not always necessary to use asbestos together with pulp as the fibers to be used. This is based on the fact that gypsum dihydrate is used in admixture as the powdery gypsum.

Further, 2 it is unnecessary to particularly increase the amount of a setting retarder blended for carrying out a stabilized, continuous operation when cloudy filtrate and flown away gypsum are circulated and used, as compared with the case where no gypsum dihydrate is blended. Furthermore, 3 if tartaric acid or its metal salt and an amino acid derivative (e.g. Pufftard, a trade name of a commercially available product) as the setting retarder are blended in combination, small amounts are sufficient as the amount of the retarder added as compared with the case where tartaric acid or its metal salt is singly used, and most of the amino acid derivative contained before the press molding moves into the filtered water, through the press molding carried out after the sheet-making in the process of the present invention; hence the hydration effect of the sheet is accelerated so that a good gypsum board having a high strength is obtained in a short time. 4 When gypsum dihydrate is used in admixture, the resulting product has a good dimensional stability. For example, when the proportion of gypsum dihydrate is 20%, the percentage of change in length through water absorption becomes about ½; thus the product has much superior properties as compared with conventional, commercially available building materials.

Further, the gypsum board according to the process of the present invention has such an advantage that gypsum boards according to conventional process, prepared in admixture of only a few % of gypsum dihydrate, have a notably reduced strength as compared with the case of non-admixture; whereas in the case of the gypsum board of the present invention, reduction in strength is small even when gypsum dihydrate is used in a half amount of the raw materials for the board. Further, the gypsum board according to the process of the present invention is superior not only in fire resistance and water resistance but also in various physical properties as interior materials, i.e. bending strength, high-impact strength, softness, processability, nail-retaining properties, etc., to those of conventional products.

Further, according to the present invention, only by stacking a plurality of green sheets having a thickness (less than 6 mm) which are liable to be produced most homogeneously and efficiently according to sheet-making process, depending on the objective thickness, followed by press molding, it is possible to obtain a noncombustible laminated gypsum board having practical physical properties which could not have been attained with a single sheet according to conventional sheet-making process, without harming productivity according to sheet-making process.

When a certain thickness is required, a processing of stacking a plurality of sheets has so far been needed, whereas in the case of the present invention, since a product having a desired thickness is obtained, it is possible to reduce the number of processings. As to the physical properties of the resulting laminate, for example, when fire resistance (JIS A1304, one hour heating test) was inspected, a laminate of two single sheets having a thickness of 12 mm did not pass the inspection in 55 minutes, but laminated sheets of 24 mm thick passed the inspection in 67 minutes. Further, in the case of laminated sheets having a reinforcing material such as fibrous material contained between the green sheets, it is possible to obtain a constructing material having notably improved bending strength, sound insulating properties, fire resistance, etc., being thinner and having similar properties.

Thus, the gypsum board of the present invention can be singly applied to structural materials surpassing the limits of properties of known gypsum boards, such as fireproof, heat insulating materials, sound insulating materials, etc. Further, in the case of laminated boards having fibrous materials placed therebetween, it is possible to notably improve their bending strength, sound insulating properties, fire retarding properties, and also it is possible to obtain structural materials which are thinner and have similar properties.

Next, Examples and Comparative examples according to sheet-making process and other production processes will be shown. As the testing methods therefor, the following were employed:

Bending strength and deflection: according to JIS A 5418 (asbestos cement calcium silicate board)
High-impact strength: according to JIS C 2210 (asbestos cement board for electric insulation)
Percentage of dimensional change: according to JIS A 5418 (percentage of change in length due to water absorption)
Percentage of heat shrinkage: according to JIS A 9510 (calcium silicate heat-insulating material)
Heating conditions: heating for 2 hours at 850° C.
Non-combustibility: Notification No. 1828 of the Ministry of Construction, Japan

EXAMPLES 1~9 AND COMPARATIVE EXAMPLES 1~6

The following raw materials were blended in proportions as indicated in Table 1 described later.

Flue gas-desulfurization gypsum: gypsum dihydrate byproduced according to flue gas-desulfurization process (particle size: 0.59 mm sieve pass; Blaine: 1200 $cm^2/g$)
Phosphoric acid gypsum: phosphoric acid gypsum dihydrate (particle size: 0.59 mm sieve pass; Blaine: 900 $cm^2/g$)
$\beta$-type hemihydrate gypsum: commercially available calcined gypsum
$\alpha$-type hemihydrate gypsum: commercially available $\alpha$-type molding plaster
Asbestos: amosite asbestos defibrated and ground by pan type grinder
Used paper: used news paper pulp
Glass fiber: E glass fiber, length ½ inch
Slaked lime: commercially available product
Tartaric acid: commercially available product
Amino acid derivative: Pufftard S-02 (made by Ajinomoto Co., Inc.)

As to the bending method of the above raw materials, only tartaric acid and amino acid derivative as setting retarder were used in outer percentage by weight based on $\beta$-type hemihydrate gypsum or $\alpha$-type hemihydrate gypsum as a hydraulic gypsum, and others refer to inner parts by weight (note: same as % by weight).

As to the blending order, to a slurry obtained by blending definite amounts of asbestos, fibers such as used paper or glass fibers, slaked lime, gypsum dihydrate, tartaric acid and an amino acid derivative and water, was added a definite amount of $\beta$-type hemihydrate gypsum or $\alpha$-type hemihydrate gypsum, followed by blending these and then adjusting the amount of water so that the concentration of the total solids might be 10% by weight in the slurry.

The thus obtained slurry was subjected to sheet-making by means of rotating drums in Hatschek process, and taken up on an endless felt to form a thin film, which was then dehydrated by a dehydrating apparatus having a suction force of $-8 \sim 10$ mmHg, followed by laminating the resulting film on the sheet-making roll till a thickness of 6 mm as an objective one at the time of finishing was attained. The resulting laminate was cut by means of a cutter to obtain a green sheet.

The thus obtained green sheet was press-dehydrated under a definite pressure before the hemihydrate gypsum contained therein was hydrated, followed by setting and drying the press-dehydrated material to obtain gypsum boards according to the process of the present invention or of Comparative examples. Further, Comparative examples were carried out in the same manner as in Examples except that gypsum dihydrate was not added or used in more than 50% by weight.

The gypsum board products thus obtained were subjected to various properties tests. The results are shown in Table 2.

EXAMPLES 10~18 AND COMPARATIVE EXAMPLES 7~12

Gypsum boards were obtained by using the same raw materials as those used in Examples 1~9, mixing these in proportions indicated in Table 3 shown below, adding to the mixture, water in ten times by weight the weight of the mixture (solids) to obtain a slurry, which was then cast on a filter paper and spread to a uniform thickness, followed by sucking-filtering, thereafter press molding under pressures indicated in the Table and successively setting and drying. The resulting gypsum boards were subjected to measurements of bending strength and percentage of dimensional change. The results are shown in the Table.

TABLE 1

| Nos. of Example and Compar. ex. | Kind of gypsum | | | | Fibers | | | Slaked lime | Retarder | | Molding pressure (Kg/cm²) |
|---|---|---|---|---|---|---|---|---|---|---|---|
| | Flue gas desulfurization | Phosphoric acid dihydrate | β-type hemihydrate | α-type hemihydrate | Asbestos | Used paper | Glass fibers | | Tartaric acid | Amino acid derivative | |
| Ex. 1 | 18 | | 72 | | 4.5 | 4.0 | 0.5 | 1.0 | 0.3 | 0.3 | 100 |
| Ex. 2 | 9.2 | | 82.8 | | 6.0 | | 1.0 | 1.0 | 0.15 | 0.15 | 80 |
| Ex. 3 | 18.4 | | 73.6 | | 6.0 | | 1.0 | 1.0 | 0.3 | 0.3 | 80 |
| Ex. 4 | 27.6 | | 64.4 | | 6.0 | | 1.0 | 1.0 | 0.4 | 0.4 | 80 |
| Ex. 5 | 36.8 | | 55.2 | | 6.0 | | 1.0 | 1.0 | 0.45 | 0.45 | 80 |
| Ex. 6 | 46 | | 46 | | 6.0 | | 1.0 | 1.0 | 0.5 | 0.5 | 80 |
| Ex. 7 | 18 | | 72 | | 4.5 | 4.0 | 0.5 | 1.0 | 0.3 | 0.3 | 0 |
| Ex. 8 | | 18.4 | | 73.6 | | 5.0 | 1.0 | 2.0 | 0.25 | 0.25 | 80 |
| Ex. 9 | | 18.4 | | 73.6 | | 5.0 | 1.0 | 2.0 | 0.70 | | 80 |
| Compar. ex. 1 | | | 90 | | 4.5 | 4.0 | 0.5 | 1.0 | 0.1 | 0.1 | 100 |
| Compar. ex. 2 | | | 92 | | 6.0 | | 1.0 | 1.0 | 0.1 | 0.1 | 80 |
| Compar. ex. 3 | 55.2 | | 36.8 | | 6.0 | | 1.0 | 1.0 | 0.55 | 0.55 | 80 |
| Compar. ex. 4 | 73.6 | | 18.4 | | 6.0 | | 1.0 | 1.0 | 0.60 | 0.60 | 80 |
| Compar. ex. 5 | 92 | | | | 6.0 | | 1.0 | 1.0 | | | 80 |
| Compar. ex. 6 | | | 90 | | 4.5 | 4.0 | 0.5 | 1.0 | 0.1 | 0.1 | 0 |

TABLE 2

| No. of Example and Compar. ex. | Thickness mm | Bulk density | Bending strength Kg/cm² | High-impact strength Kg · cm/cm² | Percentage of dimensional change % | Percentage of heat shrinkage % | Non-combustible properties |
|---|---|---|---|---|---|---|---|
| Ex. 1 | 6.1 | 1.51 | 293 | 6.2 | 0.03 | 2.5 | Pass |
| Ex. 2 | 6.0 | 1.39 | 242 | 5.1 | | | |
| Ex. 3 | 6.0 | 1.41 | 245 | 5.2 | | | |
| Ex. 4 | 5.9 | 1.40 | 235 | 5.2 | | | |
| Ex. 5 | 6.1 | 1.37 | 212 | 4.8 | | | |
| Ex. 6 | 5.9 | 1.34 | 190 | 4.3 | | | |
| Ex. 7 | 6.9 | 1.12 | 116 | 3.7 | 0.05 | 3.1 | Pass |
| Ex. 8 | 6.1 | 1.40 | 238 | 5.0 | | | |
| Ex. 9 | 6.0 | 1.39 | 235 | 5.2 | | | |
| Compar. ex. 1 | 6.0 | 1.50 | 272 | 5.8 | 0.03 | 2.6 | Pass |
| Compar. ex. 2 | 5.9 | 1.40 | 230 | 6.0 | | | |
| Compar. ex. 3 | 6.1 | 1.34 | 123 | 2.7 | | | |
| Compar. ex. 4 | 6.0 | 1.31 | 85 | 2.2 | | | |
| Compar. ex. 5 | 6.1 | 1.28 | 62 | 1.6 | | | |
| Compar. ex. 6 | 7.0 | 1.11 | 118 | 3.6 | 0.05 | 3.2 | Pass |

TABLE 3

Proportions of raw materials blended and molding pressure and results (II)

| No. of Example and Compar. ex. | Kind of gypsum | | Fibrous material | | Slaked lime | Potassium tartrate | Molding* pressure | Results | | |
|---|---|---|---|---|---|---|---|---|---|---|
| | Flue gas desulfuri- zation | Calcined gypsum | Asbestos | Used paper | | | | Bulk density | Bending strength** | Percentage of dimensional change*** |
| Ex. 10 | 9 | 81 | 4.5 | 5.0 | 0.5 | 0.1 | 100 | 1.63 | 212 | 0.05 |
| Ex. 11 | 18 | 82 | 4.5 | 5.0 | 0.5 | 0.2 | 100 | 1.63 | 221 | 0.03 |
| Ex. 12 | 27 | 73 | 4.5 | 5.0 | 0.5 | 0.2 | 100 | 1.62 | 205 | 0.02 |
| Ex. 13 | 36 | 64 | 4.5 | 5.0 | 0.5 | 0.3 | 100 | 1.61 | 186 | |
| Ex. 14 | 45 | 45 | 4.5 | 5.0 | 0.5 | 0.3 | 100 | 1.59 | 163 | 0.02 |
| Ex. 15 | 27 | 73 | 4.5 | 5.0 | 0.5 | 0.2 | 50 | 1.51 | 165 | |
| Ex. 16 | 45 | 45 | 4.5 | 5.0 | 0.5 | 0.3 | 50 | 1.49 | 140 | |
| Ex. 17 | 27 | 73 | 4.5 | 5.0 | 0.5 | 0.2 | 30 | 1.42 | 122 | |
| Ex. 18 | 45 | 45 | 4.5 | 5.0 | 0.5 | 0.3 | 30 | 1.39 | 102 | |
| Compar. ex. 7 | 0 | 90 | 4.5 | 5.0 | 0.5 | 0 | 100 | 1.63 | 208 | 0.07 |
| Compar. ex. 8 | 64 | 36 | 4.5 | 5.0 | 0.5 | 0.3 | 100 | 1.53 | 128 | 0.02 |
| Compar. ex. 9 | 82 | 18 | 4.5 | 5.0 | 0.5 | 0.4 | 100 | 1.40 | 85 | |
| Compar. ex. 10 | 90 | 0 | 4.5 | 5.0 | 0.5 | 0 | 100 | 1.40 | 51 | |
| Compar. ex. 11 | 0 | 90 | 4.5 | 5.0 | 0.5 | 0 | 50 | 1.50 | 172 | |
| Compar. ex. 12 | 0 | 90 | 4.5 | 5.0 | 0.5 | 0 | 30 | 1.41 | 147 | |

Note:
*Kg/cm$^2$,
**Kg/cm$^2$,
***%

EXAMPLE 19

Drainage properties of mixture of the present invention

Wood pulps (conifer) were fibrillated at four stages of 50, 200, 400 and 700 cc in terms of values of Canadian Standard Freeness (CSF), by means of a disc type refiner. Each (5 g) of these 4 samples was mixed with calcined gypsum (45g) or a mixture of calcined gypsum (22.5 g) and a flue gas desulfurization gypsum (22.5 g). Water was added to the respective mixtures, followed by adjusting the total quantity so as to give 1 l and then stirring to obtain slurries.

These slurries were separately fed onto a 45 mesh screen of a CSF measurement device, and filtered water over 30 seconds from the time at which they were fed was collected. The volumes of the respective filtered waters were measured. The values are shown in Table 4 below. Successively the dry weights of powdery solids contained in the respective filtered waters were measured, and the resulting values are shown as quantity of powder loss in Table 5.

TABLE 4

Measurement results of quantity of filtered water
(values in Table refer to quantity of filtered water, cc)

| Proportion of gypsum blended % | CSF value of fibrillated pulps (cc) | | | |
|---|---|---|---|---|
| | 50 | 200 | 400 | 700 |
| Calcined gypsum 90 | 200 | 245 | 270 | 340 |
| Calcined gypsum 45 + gypsum dihydrate 45 | 245 | 320 | 410 | 580 |

As apparent from Table 4, in the case of the same CSF values, the quantity of filtered water of the slurry wherein gypsum dihydrate was used in admixture are much larger than that in the case of single use of calcined gypsum.

TABLE 5

Measurement results of loss quantity of powder flown away into filtered water
(values in Table refer to dry weight g)

| Proportion of gypsum blended % | CSF value of fibrillated pulps (cc) | | | |
|---|---|---|---|---|
| | 50 | 200 | 400 | 700 |
| Calcined gypsum 90 | 1.4 | 1.8 | 2.5 | 4.8 |
| Calcined gypsum 45 + gypsum dihydrate 45 | 1.0 | 1.4 | 1.9 | 3.1 |

As apparent from Table 5, in the case of the same CSF values, the loss quantity of powder in the filtered water of the slurry wherein gypsum dihydrate was used in admixture is far smaller than that in the case of single use of calcined gypsum.

EXAMPLES 20~22 AND COMPARATIVE EXAMPLE 13

A slurry according to the blending formulation and process shown in Example 1, was subjected to sheet-making by Hatschek process to obtain a green sheet of 6 mm thick. Three, six and nine of this green sheet were respectively stacked on a stainless sheet and press-molded under a pressure of 80 Kg/cm$^2$ for a retention time of 5 minutes, followed by immediately separating the resulting press-molded product from the stainless sheet by means of a vacuum carrier. The press-molded board was cured till the hydration-setting reaction was completed, followed by drying according to known method, and subjecting the dried product to test of tensile strength between layers according to JIS A 1613 to obtain values of adhesion strength between layers. Further, as a control, a single of the green sheet (unlaminated) was subjected to the above press molding, curing, drying and test of tensile strength.

Further, with the above respective gypsum boards, their break surface was observed and also their change in condition through a heating test at 850° C. for 2 hours was observed. The results are shown in Table 6.

TABLE 6

Physical properties of laminated gypsum boards

| | Ex. 20 | Ex. 21 | Ex. 22 | Comp. ex. 13 |
|---|---|---|---|---|
| | \multicolumn{4}{c}{Number of stacked sheets} | | | |
| | 3 | 6 | 9 | 1 |
| Thickness after press m/m | 15 | 30 | 45 | 5 |
| Tensile strength between layers Kg/cm² | 16.0 | 15.8 | 16.5 | 16.2 |
| Break surface observed | No peel between layers | No peel between layers | No peel between layers | No peel between layers |
| Condition after heated at 850° C. for 2 hours | No peel between layers No deformation | No peel between layers No deformation | No peel between layers No deformation | No deformation |

EXAMPLES 23~30 AND COMPARATIVE EXAMPLES 14~16

Gypsum boards were obtained using blending formulations indicated in Table 7 and according to the same process as in Examples 10~18, followed by subjecting the resulting boards to tests of bending strength, deflection at the time of water saturation, percentage of dimensional change and water resistance.

Among raw materials used, raw materials other than those shown in Examples 1~9 as follows:

Calcium carbonate powder: commercially available heavy calcium carbonate ($CaCO_3$ purity 98.2%; particle size 44μ sieve on 2%)

Portland cement: commercially available Normal Portland cement

Further, the tests of deflection at the time of water saturation and water resistance were carried out according to the following methods:

Deflection at the time of water saturation:
A test piece was dipped in water at 20° C. to bring it to water-saturated condition, followed by measurement of deflection according to JIS A 1408. Spun length: 100 m/m.

Water resistance test:
A test piece was dipped in water contained in a plastic vessel, followed by continuously pouring tap water at a rate of 3 l/min. for 72 hours, thereafter taking out the test piece, drying it at 45° C. to absolute dry weight and measuring its bending strength.

The results are shown in FIGS. 2~5.

What we claim is:

1. A process for producing a non-combustible gypsum board which includes
   (1) preparing a mixture consisting essentially of
      (a) a powdery gypsum composed of 50 to 95 parts by weight of a hydraulic gypsum and 5 to 50 parts by weight of gypsum dihydrate,
      (b) 0.5 to 30 parts by weight of fibers based on 100 parts by weight of said powdery gypsum.,
      (c) 0.1 to 2.0 parts by weight of a setting retarder for the hydraulic gypsum based on 100 parts by weight of said hydraulic gypsum, and
      (d) water, and thereafter
   (2) molding said mixture before said hydraulic gypsum is completely hydrated, and
   (3) setting and drying the resulting molded material.

2. A process according to claim 1 wherein said fibers are selected from the group consisting of asbestos fibers, cellulose fibers and a combination thereof.

3. A process according to claim 1 wherein said setting retarder is tartaric acid or its metal salts.

4. A process according to claim 1 wherein said setting retarder is a mixture of tartaric or its metal salts with an amino acid derivative.

5. A process according to claim 1 wherein a basic inorganic substance is added to the product of step (1) and the pH thereof is adjusted to 7 or more.

6. A process according to claim 5 wherein said basic inorganic substance is Portland cement.

7. A process according to claim 5 wherein said basic inorganic substance is powdery calcium carbonate.

8. A process according to claim 1 wherein said molding is carried out by press molding under a pressure of 10 to 500 Kg/cm².

9. A process according to claim 1 wherein said molding is carried out according to the Hatschek process.

10. A process according to claim 9 wherein a green sheet obtained after said sheet-making is press-molded under a pressure of 10 to 500 Kg/cm².

11. A process for producing a non-combustible laminated gypsum board which includes
    (1) preparing a mixture consisting essentially of
       (a) a powdery gypsum composed of 50 to 95 parts by weight of a hydraulic gypsum and 5 to 50 parts by weight of gypsum dihydrate
       (b) 0.5 to 30 parts by weight of fibers based on 100 parts by weight of said powdery gypsum

TABLE 7

| No. of Example and Compar. ex. | Kind of gypsum | | | | | Fibers | | | Retarder | | Molding pressure (Kg/cm²) |
|---|---|---|---|---|---|---|---|---|---|---|---|
| | Flue gas desulfurization dihydrate | β-type hemi-hydrate | Basic substance | | | Asbestos | Used paper | Glass fiber | Tartaric acid | Amino acid derivative | |
| | | | Slaked lime | CaCO₃ powder | Portland cement | | | | | | |
| Ex. 23 | 9 | 75 | | | 7 | 4.5 | 4.0 | 0.5 | 0.15 | 0.15 | 100 |
| Ex. 24 | 9 | 72 | | | 10 | 4.5 | 4.0 | 0.5 | 0.15 | 0.15 | 100 |
| Ex. 25 | 9 | 62 | | | 20 | 4.5 | 4.0 | 0.5 | 0.12 | 0.12 | 100 |
| Ex. 26 | 9 | 52 | | | 30 | 4.5 | 4.0 | 0.5 | 0.12 | 0.12 | 100 |
| Ex. 27 | 9 | 75 | | 7 | | 4.5 | 4.0 | 0.5 | 0.15 | 0.15 | 100 |
| Ex. 28 | 9 | 72 | | 10 | | 4.5 | 4.0 | 0.5 | 0.15 | 0.15 | 100 |
| Ex. 29 | 9 | 62 | | 20 | | 4.5 | 4.0 | 0.5 | 0.12 | 0.12 | 100 |
| Ex. 30 | 9 | 52 | | 30 | | 4.5 | 4.0 | 0.5 | 0.10 | 0.10 | 100 |
| Compar. ex. 14 | 9 | 81 | 1 | | | 4.5 | 4.0 | 0.5 | 0.15 | 0.15 | 100 |
| Compar. ex. 15 | 9 | 42 | | | 40 | 4.5 | 4.0 | 0.5 | 0.12 | 0.12 | 100 |
| Compar. ex. 16 | 9 | 42 | | 40 | | 4.5 | 4.0 | 0.5 | 0.10 | 0.10 | 100 |

(c) 0.1 to 2.0 parts by weight of a setting retarder for the hydraulic gypsum based on 100 parts by weight of said hydraulic gypsum, and (d) water sufficient to hydrate said hydraulic gypsum, (2) making said mixture into a sheet by a cylindrical gauze type sheet-making process, (3) laminating two or more of said green-sheets before said gypsum is said green sheet is completely hydrated, (4) molding the laminated sheets under a pressure of 30 to 500 Kg/cm$^2$ to thereby integrate them, and (5) setting and drying the resulting molded laminate.

12. A process according to claim 11 wherein said fibers are selected from the group consisting of asbestos fibers, cellulose fibers and a combination thereof.

13. A process according to claim 11 wherein said setting retarder is tartaric acid or its metal salts.

14. A process according to claim 11 wherein a basic inorganic substance is added to the produce to step (1) and the pH of said product of step (1) is adjusted to 7 or more.

15. A process according to claim 11 wherein said setting retarder is a mixture of tartaric acid or its metal salts with an amino acid derivative.

16. A composition for producing a non-combustible gypsum board that is composed of a mixture consisting essentially of (a) a powdery gypsum that includes 50 to 95 parts by weight of hydraulic gypsum and 5 to 50 parts by weight of gypsum dihydrate, (b) 0.5 to 30 parts by weight of fibers based on 100 parts by weight of said powdery gypsum, and (c) 0.1 to 2.0 parts by weight of a setting retarder for the hydraulic gypsum based on 100 parts by weight of said hydraulic gypsum.

17. A composition according to claim 16 wherein said fibers are selected from the group consisting of asbestos fibers, cellulose fibers and a combination thereof.

18. A composition according to claim 16 wherein said setting retarder is tartaric acid or its metal salts.

19. A composition according to claim 16 wherein said setting retarder is a mixture of tartaric acid or its metal salts with an amino acid derivative.

20. A composition according to claim 16 which additionally includes a basic inorganic substance in a quantity sufficient to adjust the pH of said mixture of 7 or more.

* * * * *